United States Patent
Ridder et al.

(10) Patent No.: US 11,091,032 B2
(45) Date of Patent: Aug. 17, 2021

(54) PEDAL FOR A MOTOR VEHICLE

(71) Applicant: HELLA GMBH & CO. KGAA, Lippstadt (DE)

(72) Inventors: Ralf Ridder, Lippstadt (DE); Claus Viethen, Erwitte (DE); Werner Austermeier, Schloss Holte-Stukenbrock (DE); Kerim Florian Huge, Paderborn (DE); David Schliwa, Bielefeld (DE); Bernd Schmitt, Lippstadt (DE); Robert Schuermann, Herzebrock-Clarholz (DE); Andreas Mueller, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/063,699

(22) Filed: Oct. 5, 2020

(65) Prior Publication Data

US 2021/0016660 A1    Jan. 21, 2021

Related U.S. Application Data

(63) Continuation of application No. PCT/EP2019/058052, filed on Mar. 29, 2019.

(30) Foreign Application Priority Data

Apr. 3, 2018 (DE) .......................... 102018107788.2

(51) Int. Cl.
*G05G 1/30* (2008.04)
*B60K 26/02* (2006.01)
(Continued)

(52) U.S. Cl.
CPC ............. *B60K 26/021* (2013.01); *G05G 1/38* (2013.01); *G05G 1/44* (2013.01); *G05G 5/03* (2013.01)

(58) Field of Classification Search
CPC .. G05G 1/30; G05G 1/38; G05G 1/44; G05G 1/445; G05G 5/03; B60K 26/021; B60T 7/04; B60T 7/06
See application file for complete search history.

(56) References Cited

U.S. PATENT DOCUMENTS

| | | | |
|---|---|---|---|
| 8,001,870 B2 * | 8/2011 | Saito ........................ | G05G 1/30 74/513 |
| 8,806,978 B2 | 8/2014 | Saito et al. | |

(Continued)

FOREIGN PATENT DOCUMENTS

| | | |
|---|---|---|
| DE | 102006035882 A1 | 2/2008 |
| DE | 102012216981 A1 | 3/2013 |

(Continued)

OTHER PUBLICATIONS

Machine translation of EP 3031653 A1 obtained on Jan. 11, 2021.*
International Search Report dated Jul. 12, 2019 in corresponding application PCT/EP2019/058052.

*Primary Examiner* — Adam D Rogers
(74) *Attorney, Agent, or Firm* — Muncy, Geissler, Olds & Lowe, P.C.

(57) ABSTRACT

In order to provide a pedal for a motor vehicle in which restoration of the pedal arm to its rest position is improved, it is proposed that a friction system has a rocker and the first return spring is disposed between the separate friction element and the rocker such that when the pedal arm moves in the direction of its maximum actuation position, the rocker is pressed against a friction surface of the separate friction elements in a friction force-generating manner, wherein the separate friction element is connected to the pedal arm in a compressive force-transmitting manner by means of the at least one first return spring, a bearing part for a second return spring, and a connecting element, and wherein the second return spring is disposed between the (Continued)

bearing part and the base part or the bearing part and the rocker.

12 Claims, 1 Drawing Sheet

(51) Int. Cl.
    *G05G 1/38* (2008.04)
    *G05G 1/44* (2008.04)
    *G05G 5/03* (2008.04)

(56) References Cited

U.S. PATENT DOCUMENTS

| | | | |
|---|---|---|---|
| 9,829,908 B2 * | 11/2017 | Roberts | ................ G05G 1/445 |
| 10,220,703 B2 * | 3/2019 | Viethen | ................ B60K 26/021 |
| 2003/0154817 A1 | 8/2003 | Staker | |

FOREIGN PATENT DOCUMENTS

| | | | | |
|---|---|---|---|---|
| DE | 102018107789 A1 * | 10/2019 | ................ | G05G 1/44 |
| EP | 3031653 A1 * | 6/2016 | ........... | B60K 26/021 |
| EP | 2987046 B1 * | 6/2017 | ............. | G05G 1/445 |
| WO | WO-2004108465 A1 * | 12/2004 | ................ | G05G 5/03 |

\* cited by examiner

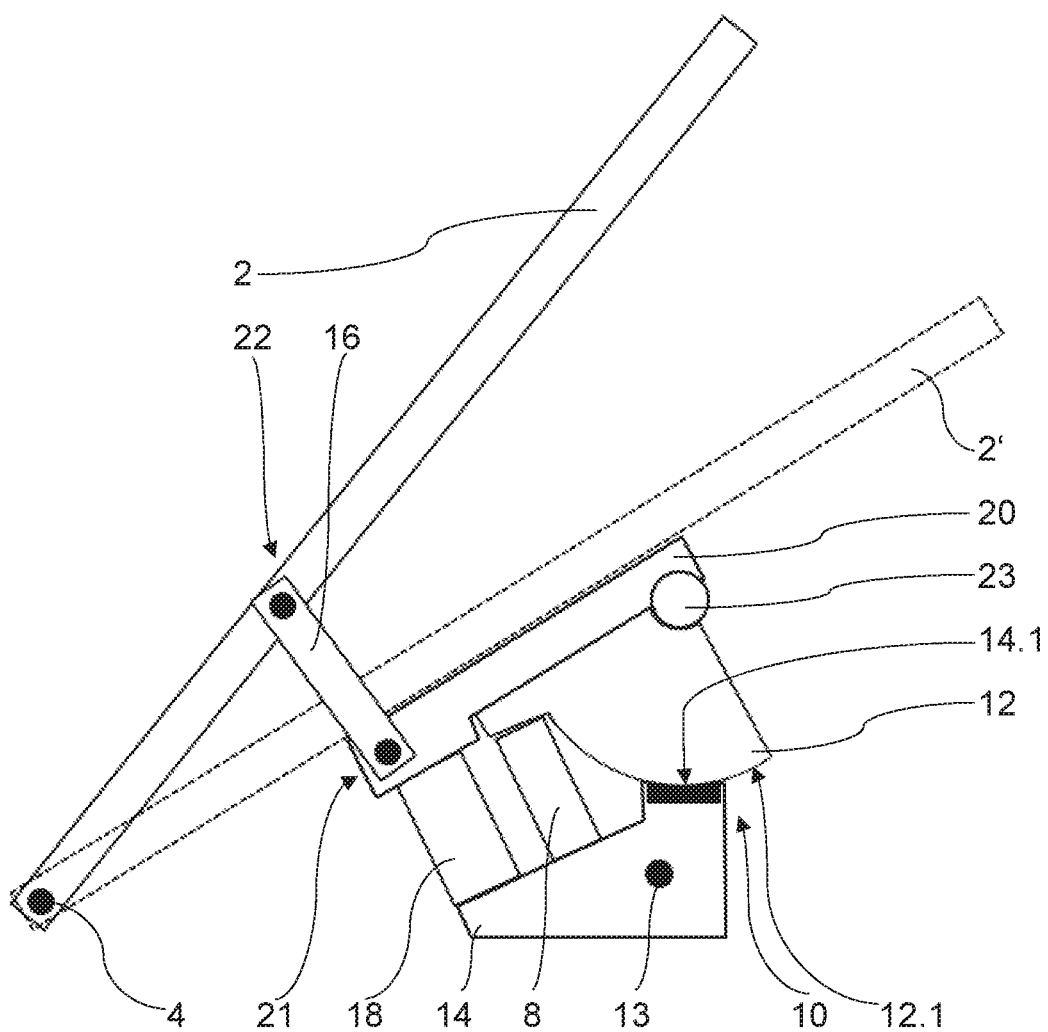

PEDAL FOR A MOTOR VEHICLE

This nonprovisional application is a continuation of International Application No. PCT/EP2019/058052, which was filed on Mar. 29, 2019, and which claims priority to German Patent Application No. 10 2018 107 788.2, which was filed in Germany on Apr. 3, 2018, and which are both herein incorporated by reference.

BACKGROUND OF THE INVENTION

Field of the Invention

The present invention relates to a pedal for a motor vehicle.

Description of the Background Art

Pedals of this kind for motor vehicles are already known from the state of the art in numerous design variants.

For example, EP 2 987 046 B1, which corresponds to U.S. Pat. No. 9,829,908, discloses a bidirectional pedal assembly for a motor vehicle in which a pedal support member is pivotally mounted on a base structure. The pedal support member can be pivoted from a rest position about an axis of rotation in a first direction and in a second direction opposite to the first direction. First or second springs urge the pedal support member into its rest position. A first or second frictional mechanism is disposed in each case between the pedal support member and the first and second spring, respectively, wherein the first and second frictional mechanism are each configured to retard the pivotal movements of the pedal support member. The first and second frictional mechanism for generating a frictional force upon movement of the pedal support member each have two members which are in abutment with and moveable to one another and which are designed so that when the two members are pressed apart under the action of a force, at least one surface of one of the elements is pressed against a surface that is fixed in relation to the base structure.

SUMMARY OF THE INVENTION

It is therefore an object of the present invention to provide a pedal for a motor vehicle in which restoration of a pedal arm of the pedal to its rest position is improved.

The object is achieved in an exemplary embodiment by a pedal for a motor vehicle according to which the friction system has a rocker, rotatably disposed on the base part, and the at least one first return spring is disposed between the separate friction element and the rocker such that when the pedal arm moves in the direction of its maximum actuation position, the rocker is pressed against a friction surface of the separate friction element in a friction force-generating manner, wherein the separate friction element is connected to the pedal arm in a compressive force-transmitting manner by means of the at least one first return spring, a bearing part for at least one second return spring which promotes the movement of the pedal arm in the direction of its rest position, and at least one connecting element, and wherein the at least one second return spring is disposed between the bearing part and the base part or the bearing part and the rocker. The dependent claims relate to advantageous refinements of the invention.

An advantage of the pedal of the invention for a motor vehicle is in particular that a restoration of the pedal arm of the pedal to its rest position is improved. The friction partners of a friction pair, namely the friction surface of the separate friction element and a corresponding friction surface of the rocker, can block, for example, so that in such a case a relative movement between the two friction partners is prevented but at least made very difficult. Due to the pedal design of the invention for a motor vehicle, a movement of the pedal arm of the pedal in the direction of its rest position, that is, a restoration of the pedal arm of the pedal, is also improved in such a case.

This is because the separate friction element is connected to the pedal arm by means of the bearing part and the at least one connecting element, on the one hand, only in a compressive force-transmitting manner. On the other hand, this is because the at least one second return spring does not act by means of the separate friction element, but is disposed and acts between the pedal arm and the base part or between the pedal arm and the rocker by means of the bearing part and the at least one connecting element. In addition, the restoration of the pedal arm of the pedal to its rest position is also promoted by means of the at least one second return spring even if the at least one first return spring is nonfunctional. For example, this is the case if the at least one first return spring itself is blocked or broken.

The at least one connecting element can be freely selected within wide suitable limits according to type, mode of operation, material, dimensioning, configuration, and number. An advantageous refinement of the pedal of the invention for a motor vehicle provides that the at least one connecting element is designed as a coupling bar. As a result, the at least one connecting element is realized in a structurally simple and mechanically robust manner.

The at least one connecting element can be designed as a single connecting element. In this way, the number of the at least one connecting element is reduced to a minimum. Accordingly, the number of components of the pedal of the invention is also reduced. However, it is also conceivable that, for example, a plurality of connecting elements are used.

In principle, the friction system and thus also the rocker of the pedal of the invention for a motor vehicle can be freely selected within wide suitable limits according to type, mode of operation, material, dimensioning, configuration, and number. It is expediently provided that, when the friction system and the at least one first return spring function properly, the rocker is in a force-transmitting connection with the pedal arm by means of the at least one first return spring, the separate friction element, the bearing part, and the at least one connecting element.

It is advantageously provided that, when the friction system and the at least one first return spring function properly, the rocker is in a force-transmitting connection with the pedal arm by means of the at least one first return spring, the separate friction element, the bearing part, the at least one second return spring, and the at least one connecting element. In this way, the at least one first return spring and the at least one second return spring can be used particularly effectively synergistically with regard to force transmission. Accordingly, the at least one first return spring and the at least one second return spring can each be designed in a reduced form, for example, taking into account the synergy. A compact and thus space-saving design of the pedal of the invention for a motor vehicle is thus promoted.

The at least one second return spring can be designed such that if the friction system and/or the at least one first return spring are not functioning properly, the pedal arm can be returned automatically to its rest position when the pedal arm is not actuated. This ensures the desired restoration of the pedal arm to its rest position in every operating case of the pedal arm of the invention and also in the event of a possible failure in the friction system and/or the at least one first return spring.

In principle, the relative arrangement of the separate friction element and the bearing part to one another can be freely selected within wide suitable limits. It is advantageously provided that the separate friction element and the bearing part are arranged substantially in series to one another and directly following one another. The arrangement relates to the force flow. In this way, a compact and thus space-saving design of the pedal according to the invention is simplified.

The bearing part for the at least one second return spring can be freely selected within wide suitable limits according to type, mode of operation, material, dimensioning, configuration, and number. An advantageous refinement of the pedal of the invention for a motor vehicle provides that the bearing part is designed as a sensor part by means of which an angle of rotation of the pedal arm relative to the base part can be determined. In this way, detection of the angle of rotation of the pedal arm is realized in a structurally simple manner. By means of the angle of rotation it is also possible to determine variables that are dependent on the angle of rotation of the pedal arm and to use them, for example, for controlling or regulating the motor vehicle.

The at least one first return spring and the at least one second return spring can be freely selected within wide suitable limits according to type, mode of operation, material, configuration, and number. However, an advantageous refinement of the pedal of the invention for a motor vehicle provides that the spring force action lines of the at least one first return spring and the at least one second return spring run substantially parallel to one another. As a result, the synergy between the at least one first return spring and the at least one second return spring is additionally improved during proper functioning of the pedal of the invention for a motor vehicle. The at least one first return spring and the at least one second return spring can be designed to be correspondingly matched to one another in order to complement each other during normal operation of the pedal of the invention for a motor vehicle, therefore, when the pedal of the invention is functioning properly, and thus to be able to design the individual first and second return springs more compact.

The at least one first return spring and/or the at least one second return spring can be designed as a double spring. In this way, security against a malfunction of the at least one first return spring and/or the at least one second return spring is improved.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows an exemplary embodiment of a pedal of the invention for a motor vehicle in a partial side view.

DETAILED DESCRIPTION

The FIGURE shows by way of example an exemplary embodiment of a pedal of the invention for a motor vehicle. The pedal is designed as an accelerator pedal, therefore, as a gas pedal, of the motor vehicle.

The pedal has a pedal arm 2, which is mounted rotatably about an axis of rotation 4 on a base part and can be moved back and forth between a rest position and a maximum actuation position. In the FIGURE, pedal arm 2 is shown in its rest position, whereas the maximum actuation position of pedal arm 2 is only indicated in the FIGURE by a pedal arm 2' by dashed lines. A movement of pedal arm 2 in the direction of its rest position shown in the FIGURE is promoted by means of a first return spring 8. In the present exemplary embodiment, first return spring 8 is designed as a coil spring.

Furthermore, the pedal has a friction system 10 for generating a friction force when pedal arm 2 moves in the direction of its maximum actuation position. Friction system 10 has a separate friction element 12 with a friction surface 12.1 and a rocker 14 with a friction surface 14.1, wherein friction surfaces 12.1 and 14.1 are designed to correspond to one another. As can be seen from the FIGURE, the separate friction element 12 is in particular formed separately from pedal arm 2. This will be explained in more detail below.

Rocker 14 is disposed rotatably about an axis of rotation 13 on the base part, wherein first return spring 8 is disposed between the separate friction element 12 and rocker 14 such that when pedal arm 2 moves in the direction of its maximum actuation position, friction surface 14.1 of rocker 14 is pressed against friction surface 12.1 of the separate friction elements 12 in a friction force-generating manner.

A second return spring 18, which promotes the movement of pedal arm 2 in the direction of its rest position, is disposed between rocker 14 and a bearing part 20 for second return spring 18. Bearing part 20 is connected in a force-transmitting and articulated manner to pedal arm 2 by means of a connecting element 16 designed as a coupling bar. For this purpose, a joint 21, 22 is formed, on the one hand, between bearing part 20 and connecting element 16 and, on the other, between connecting element 16 and pedal arm 2. Bearing part 20 is connected to pedal arm 2 in a positive and articulated manner by means of connecting element 16.

The spring force action lines of first return spring 8 and second return spring 18 run substantially parallel to one another.

First return spring 8 is pretensioned in the rest position of pedal arm 2, so that in the rest position of pedal arm 2, first return spring 8 presses the separate friction element 12 against bearing part 20, as a result of which bearing part 20 is pressed against connecting element 16 designed as a coupling bar. For this purpose, the separate friction element 12 is connected in an articulated manner to bearing part 20 by means of a joint 23. Bearing part 20 is connected in a force-transmitting and articulated manner to pedal arm 2 by means of connecting element 16 and joints 21, 22. Thus, the separate friction element 12 is connected to pedal arm 2 by means of first return spring 8, bearing part 20, and connecting element 16 in a compressive force-transmitting manner. The at least one connecting element 16, designed as a coupling bar, is designed as a single connecting element 16 in the present exemplary embodiment. When the pedal is functioning properly, the separate friction element 12 is connected to pedal arm 2 in a compressive force-transmitting manner by means of first return spring 8, bearing part 20, and connecting element 16 in every actuation position of the pedal and thus in every actuation position of pedal arm 2.

Furthermore, in the present exemplary embodiment, bearing part 20 is designed at the same time as a sensor part 20, by means of which an angle of rotation of pedal arm 2 around joint 23 and relative to the base part can be determined in a manner known to a skilled artisan.

In the present exemplary embodiment of the pedal of the invention for a motor vehicle, the separate friction element 12 and bearing part 20 are arranged in series and directly following one another. Accordingly, the construction of the pedal of the invention is very compact and the pedal of the invention for a motor vehicle thus has a space-saving design.

Second return spring 18, analogous to first return spring 8, is also designed as a coil spring 18. Second return spring 18 is also pretensioned in the rest position of pedal arm 2, so that second return spring 18 holds pedal arm 2 in its rest position by means of rocker 14, mounted on the base part by means of the axis of rotation 13, bearing part 20, and connecting element 16 when pedal arm 2 is not actuated. Second return spring 18 is designed such that second return spring 18 is connected to pedal arm 2 in a compressive force-transmitting manner with a properly functioning pedal as well as with an improperly functioning friction system 10 and/or an improperly functioning first return spring 8 in every actuation position of the pedal and thereby in every actuation position of pedal arm 2.

In addition, second return spring 18 is designed such that if friction system 10 and/or the at least one first return spring 8 do not function properly, pedal arm 2 can be automatically transferred to its rest position if pedal arm 2 is not actuated.

The pedal of the invention will be explained in more detail hereinbelow by way of example according to the present exemplary embodiment and with reference to the FIGURE.

A user of the pedal, a vehicle driver of the motor vehicle equipped with the pedal, actuates the pedal by pressing pedal arm 2 downward in the image plane of the FIGURE by means of a foot. In this regard, pedal arm 2 rotates about axis of rotation 4 relative to the base part in the image plane of the FIGURE in a clockwise direction about axis of rotation 4 to the bottom right. Due to first return spring 8 which is disposed between separate friction element 12 and rocker 14, separate friction element 12, when the pedal is functioning properly, is pressed against pedal arm 2 in a compressive force-transmitting manner in every actuation position of the pedal, therefore, in every possible position of pedal arm 2, from its rest position to its maximum operating position, by means of bearing part 20 and connecting element 16.

Bearing part 20, when the pedal is functioning properly, is pressed against pedal arm 2 in a compressive force-transmitting manner in every actuation position of the pedal, therefore, in every possible position of pedal arm 2, from its rest position to its maximum operating position, also by means of second return spring 18 and connecting element 16. In addition, bearing part 20 is connected in a positive and articulated manner to pedal arm 2 of the pedal by means of connecting element 16 and the two joints 21, 22. In contrast to the separate friction element 12, there is thus not only a compressive force-transmitting connection between bearing part 20 and pedal arm 2, but also a tensile force transmitting connection.

The force applied by the user on pedal arm 2 causes first return spring 8 and second return spring 18 to be compressed against the respective spring force. In the aforementioned transfer of pedal arm 2 from its rest position to its maximum actuation position of pedal arm 2', separate friction element 12 and rocker 14 move relative to one another. Accordingly, corresponding friction surfaces 12.1 and 14.1 of separate friction element 12 and rocker 14 also move relative to one another. In so doing, friction surface 14.1 of rocker 14 is pressed against friction surface 12.1 of separate friction element 12 in a friction force-generating manner.

When the pedal is functioning properly, pedal arm 2 of the pedal would be transferred back from the maximum actuation position of pedal arm 2', to the rest position of pedal arm 2 due to the spring forces of first return spring 8 and second return spring 18 provided that the user no longer exerts pressure on pedal arm 2.

Should the pedal according to the present exemplary embodiment not function properly, for example, because friction system 10 and/or first return spring 8 no longer function properly, second return spring 18 automatically presses pedal arm 2 into its rest position when pedal arm 2 is not actuated. For example, first return spring 8 is functioning properly, but the two mutually corresponding friction surfaces 12.1 and 14.1 of separate friction element 12 and rocker 14 are blocked, so that a relative movement between the two friction surfaces 12.1, 14.1 and thus between separate friction element 12 and rocker 14 is no longer possible.

Despite this malfunction, second return spring 18 has moved pedal arm 2 into its rest position as desired. This is possible, inter alia, because friction element 12 is designed as a separate friction element 12 and is thus also disposed and held on the pedal separately from pedal arm 2. Accordingly, pedal arm 2 and thus a restoration of pedal arm 2 to its rest position by a blocked friction system 10 and/or by a nonfunctional first return spring 8 are not prevented.

Due to the articulated, but only compressive force-transmitting connection of the separate friction element 12 to bearing part 20 by means of joint 23, if the friction pair, formed by friction surfaces 12.1 and 14.1, between the separate friction element 12 and rocker 14 is blocked, movement of pedal arm 2 into its rest position is not prevented. The same applies, for example, to a nonfunctional first return spring 8. In the aforementioned cases of malfunction, bearing part 20, which connected in an articulated manner to connecting element 16 by means of joint 21, can lift up from the separate friction element 12, rotating about joint 23, so that pedal arm 2 can be transferred back from its maximum actuation position to its rest position by means of rocker 14, which is mounted in an articulated manner on the base part by means of joint 13, second return spring 18, bearing part 20, and connecting element 16.

The invention is not limited to the present exemplary embodiment. For example, the pedal of the invention for a motor vehicle is also usable and can advantageously be applied to other functions of a motor vehicle. For example, the pedal of the invention for a motor vehicle could also be designed as a brake pedal or a clutch pedal. Further, the pedal of the invention for a motor vehicle can also be designed as a so-called hanging pedal. In contrast to this, the pedal of the invention for a motor vehicle according to the present exemplary embodiment is designed as a so-called standing pedal.

In contrast to the present exemplary embodiment, it is possible for the at least one second return spring to be disposed between the bearing part for the at least one second return spring and the base part. As a result, a decoupling of the at least one second return spring from the rocker is also realized. In contrast, the embodiment according to the present exemplary embodiment ensures an improved synergy between the at least one first return spring and the at least one second return spring.

It is also possible to use a plurality of the at least one first return spring and/or a plurality of the at least one second return spring. For example, it would be possible that the at least one first return spring and/or the at least one second return spring are/is designed as a double spring. There would be a double spring, for example, if an additional first return spring would be disposed concentrically to the one first return spring of the above exemplary embodiment or an additional second return spring would be disposed concentrically to the one second return spring of the present exemplary embodiment. This would additionally improve the security against malfunctions of the friction system and/or of the at least one first and/or at least one second return spring.

Instead of coil springs, other suitable spring types known to the skilled artisan are also possible for the at least one first return spring and the at least one second return spring. It is also conceivable that different types of springs are used for the at least one first return spring and the at least one second return spring. The same applies to a plurality of first return springs and a plurality of second return springs.

It is also possible for the rocker and/or the separate friction element to be constructed in multiple parts. For example, a friction piece could be disposed on the rocker and/or the separate friction element, said piece which has the friction surface of the rocker and/or the friction surface of the separate friction element.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pedal for a motor vehicle, the pedal comprising:
   a pedal arm that is mounted rotatably about an axis of rotation and adapted to be moved back and forth between a rest position and a maximum actuation position, wherein a movement of the pedal arm in a direction of the rest position is promoted by at least one first return spring; and
   a friction system to generate a friction force when the pedal arm moves in the direction of the maximum actuation position, the friction system having a separate friction element,
   wherein the friction system has a rocker that is rotatable, and the at least one first return spring is disposed between the separate friction element and the rocker with a first distal end of the at least one first return spring pushing against the separate friction element and a second distal end of the at least one first return spring pushing against the rocker, such that when the pedal arm moves in the direction of the maximum actuation position, the rocker is pressed against a friction surface of the separate friction element in a friction force-generating manner,
   wherein the separate friction element is connected to the pedal arm in a compressive force-transmitting manner via the at least one first return spring, a bearing part for at least one second return spring that promotes the movement of the pedal arm in the direction of the rest position, and at least one connecting element, and
   wherein the at least one second return spring is disposed between the bearing part and the rocker.

2. The pedal according to claim 1, wherein the at least one connecting element is a coupling bar.

3. The pedal according to claim 1, wherein the at least one connecting element is a single connecting element.

4. The pedal according to claim 1, wherein, when the friction system and the at least one first return spring function properly, the rocker is in a force-transmitting connection with the pedal arm via the at least one first return spring, the separate friction element, the bearing part, and the at least one connecting element.

5. The pedal according to claim 1, wherein the at least one second return spring is designed such that if the friction system and/or the at least one first return spring are not functioning properly, the pedal arm is returned automatically to the rest position if the pedal arm is not actuated.

6. The pedal according to claim 1, wherein the separate friction element and the bearing part are arranged in series to one another and directly following one another.

7. A pedal for a motor vehicle, the pedal comprising:
   a pedal arm that is mounted rotatably about an axis of rotation and adapted to be moved back and forth between a rest position and a maximum actuation position, wherein a movement of the pedal arm in a direction of the rest position is promoted by at least one first return spring; and
   a friction system to generate a friction force when the pedal arm moves in the direction of the maximum actuation position, the friction system having a separate friction element,
   wherein the friction system has a rocker that is rotatable, and the at least one first return spring is disposed between the separate friction element and the rocker such that when the pedal arm moves in the direction of the maximum actuation position, the rocker is pressed against a friction surface of the separate friction element in a friction force-generating manner,
   wherein the separate friction element is connected to the pedal arm in a compressive force-transmitting manner via the at least one first return spring, a bearing part for at least one second return spring that promotes the movement of the pedal arm in the direction of the rest position, and at least one connecting element,
   wherein the at least one second return spring is disposed between the bearing part and the rocker, and
   wherein the bearing part is designed as a sensor part via which an angle of rotation of the pedal arm is determined.

8. A pedal for a motor vehicle, the pedal comprising:
   a pedal arm that is mounted rotatably about an axis of rotation and adapted to be moved back and forth between a rest position and a maximum actuation position, wherein a movement of the pedal arm in a direction of the rest position is promoted by at least one first return spring; and
   a friction system to generate a friction force when the pedal arm moves in the direction of the maximum actuation position, the friction system having a separate friction element,
   wherein the friction system has a rocker that is rotatable, and the at least one first return spring is disposed between the separate friction element and the rocker such that when the pedal arm moves in the direction of the maximum actuation position, the rocker is pressed against a friction surface of the separate friction element in a friction force-generating manner, wherein the separate friction element is connected to the pedal arm in a compressive force-transmitting manner via the at least one first return spring, a bearing part for at least one second return spring that promotes the movement of the pedal arm in the direction of the rest position, and at least one connecting element, wherein the at least one second return spring is disposed between the bearing part and the rocker, and wherein spring force action lines of the at least one first return spring and the at least one second return spring run substantially parallel to one another.

9. The pedal according to claim 1, wherein the at least one first return spring and/or the at least one second return spring are/is designed as a double spring.

10. The pedal according to claim 1, wherein a first distal end of the at least one connecting element is pivotally connected to the bearing part.

11. The pedal according to claim 1, wherein a first distal end of the at least one second return spring pushes against the rocker.

12. The pedal according to claim 3, wherein a first distal end of the single connecting element is pivotally connected to the bearing part and a second distal end of the single connecting element is pivotally connected to the pedal arm.

\* \* \* \* \*